United States Patent [19]
Giordano et al.

[11] 3,975,062
[45] *Aug. 17, 1976

[54] DEVICE FOR LIMITING BRAKE PRESSURE ACCORDING TO VEHICLE LOAD AND DECELERATION

[75] Inventors: Jean Louis Giordano, Noisy-le-Roi; Michel Guettier, Rueil, both of France

[73] Assignees: Regie Nationale des Usines Renault, Billancourt; Automobiles Peugeot, Paris, both of France

[ * ] Notice: The portion of the term of this patent subsequent to Mar. 2, 1993, has been disclaimed.

[22] Filed: May 6, 1974

[21] Appl. No.: 467,226

[30] Foreign Application Priority Data
May 24, 1973 France .......................... 73.18991

[52] U.S. Cl. .................... 303/22 R; 188/195; 188/349; 303/6 C; 303/24 C
[51] Int. Cl.² .................. B60T 8/18; B60T 8/24; B60T 8/26
[58] Field of Search ............... 303/24, 22, 6 C, 6 R; 188/195, 349

[56] References Cited
UNITED STATES PATENTS

| | | | |
|---|---|---|---|
| 2,924,306 | 2/1960 | Martin | 303/24 C |
| 3,245,729 | 4/1966 | Shellhause | 303/24 F |
| 3,297,368 | 1/1967 | Cumming | 303/24 A |
| 3,317,251 | 5/1967 | Hambling et al. | 303/24 A |
| 3,383,139 | 5/1968 | Chevreux | 303/24 A |
| 3,403,946 | 10/1968 | Thirion | 303/24 C |
| 3,476,443 | 11/1969 | Bratten et al. | 303/24 C |
| 3,527,504 | 9/1970 | Chouings et al. | 303/24 A |
| 3,531,164 | 9/1970 | Francois | 303/24 C |
| 3,726,567 | 4/1973 | Burchhardt | 303/24 R UX |

FOREIGN PATENTS OR APPLICATIONS

| | | | |
|---|---|---|---|
| 94,565 | 9/1969 | France | 303/24 F |

*Primary Examiner*—Trygve M. Blix
*Assistant Examiner*—Douglas C. Butler
*Attorney, Agent, or Firm*—Stevens, Davis, Miller & Mosher

[57] ABSTRACT

A braking pressure limiter device in which an inertia responsive valve normally closes under deceleration of the vehicle but has its closing action impeded by a linkage connected to an anti-roll bar so as to be responsive to the loading of the vehicle, for example the vehicle suspension to sense loading of the rear axle.

3 Claims, 7 Drawing Figures

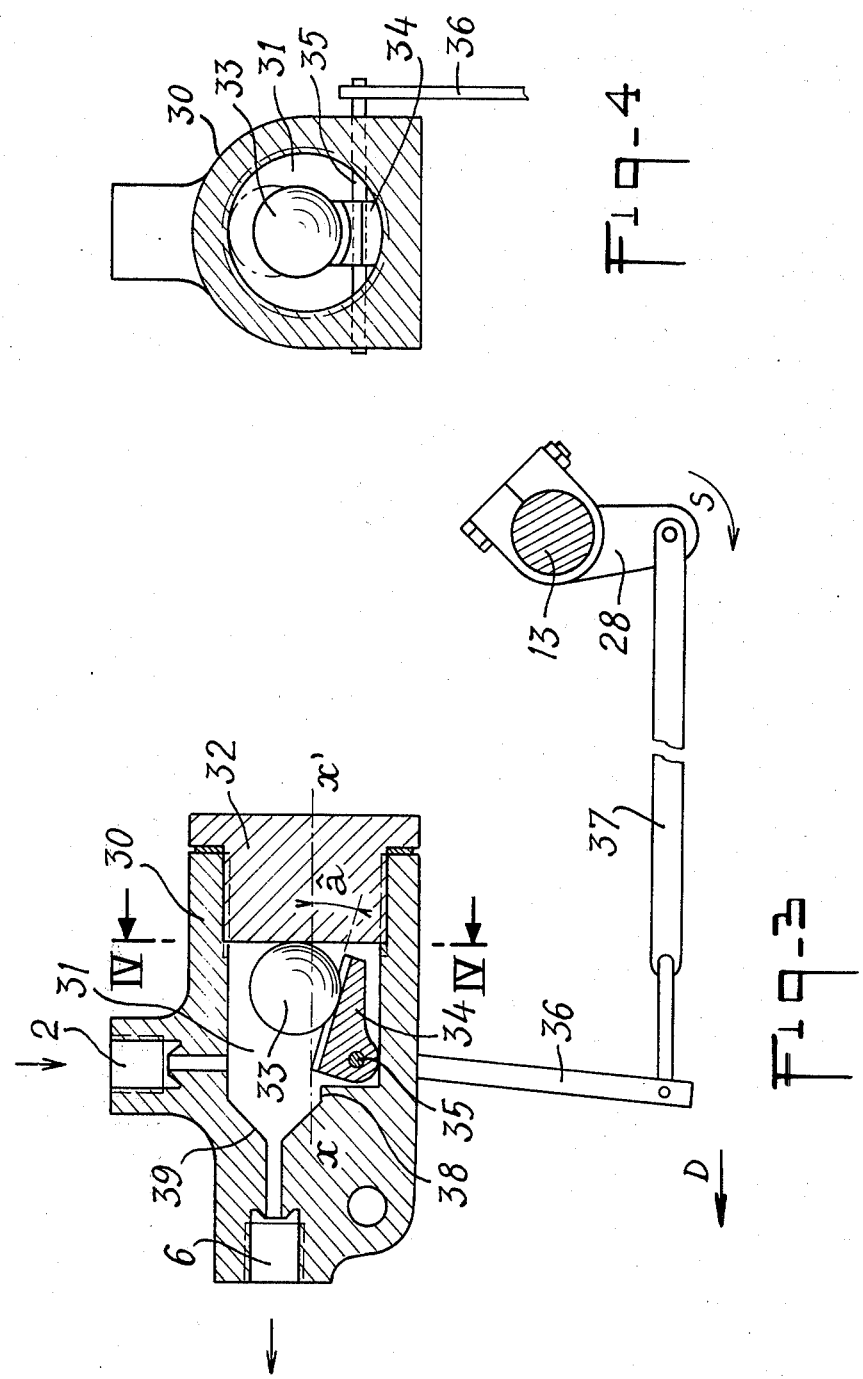

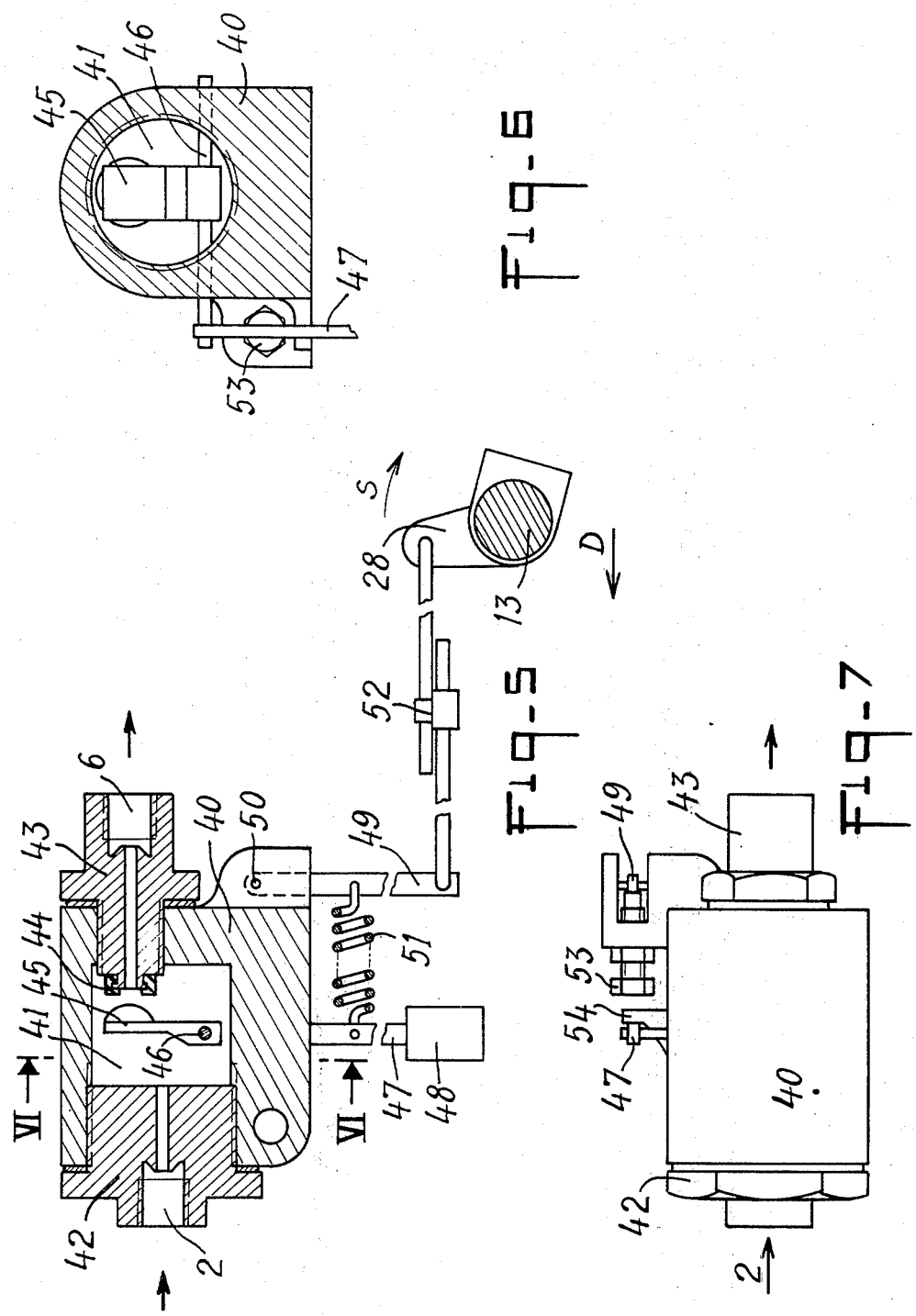

DEVICE FOR LIMITING BRAKE PRESSURE ACCORDING TO VEHICLE LOAD AND DECELERATION

The present invention relates to a device for limiting the braking effort on the rear axle of a vehicle.

Certain vehicles may have large differences in the distribution of loads, for example touring automobiles and certain utility vehicles which are intended to be used either empty or with a load which is generally mainly on the back axle.

In these vehicles the hydraulic braking pressure applied to the slave cylinders of the rear brakes depends on the axle loading with the object of preserving maximum efficiency of the rear brakes while preventing locking of the rear wheels before the front wheels lock. Braking pressure limiting devices are known which employ a valve having a moveable ball in an inclined cylinder interposed between the master cylinder and the circuit feeding hydraulic fluid to the rear brakes. These devices isolate the supply circuit of the rear brakes when a certain value of deceleration has been attained and enable a satisfactory distribution of braking to be obtained when they are subjected to the load of the vehicle.

To this end a pendulous mass of a ball tends to move the valve away from its normal position seated on the supply orifice of the rear brakes, as long as the speed of the vehicle has not been sufficiently reduced.

A known device suitable for vehicles on rails employs a work piston having one face subjected to the force exerted by the braking pressure, the mass being in other respects weighted by an element which cooperates with the elements linked to the load of the vehicle.

This device avoids prolonged locking of the rear brakes and enables the said brakes to be automatically relieved of pressure.

Such a device is not easy to apply to touring vehicles of which the drivers are apt to actuate the brakes regardless of the position of the vehicle on its trajectory.

In this case it is important for the limiting means to prevent the rear wheels from locking before the front wheels of the vehicle lock. The limiting means must also permit an increase of braking pressure in the supply circuit of the rear wheel brakes in the event of total failure of the supply circuit of the front wheel brakes, and this irrespective of the state of loading of the vehicle. Since the use of pressure limiting devices which are not subject to the load of the vehicle could not be recommended, the invention proposes a limiting device having a fixed body and subject to the load of the vehicle, but having the cut-off pressure independent of the hydraulic supply pressure.

According to the present invention we provide a braking pressure limiting device comprising a limiter body having an inlet orifice and an outlet orifice, an inertia-responsive valve capable of isolating the inlet orifice from the outlet orifice when subjected to deceleration forces arising during braking, and means responsive to the loading of the vehicle for impeding operation of said inertia-responsive valve to an extent which varies as the vehicle loading varies.

In order that the present invention may be better understood the following description is given, merely be way of example, reference being made to the accompanying drawings in which:

FIG. 3 is a view in longitudinal section of a first alternative embodiment of the device according to the invention;

FIG. 4 is a view in section of the device taken along line IV—IV of FIG. 3;

FIG. 5 is a view in longitudinal section of a second alternative embodiment of the device;

FIG. 6 is a view in transverse section along line VI—VI of FIG. 5; and

FIG. 7 is a top plan view of the device of FIG. 5.

Figure 1:
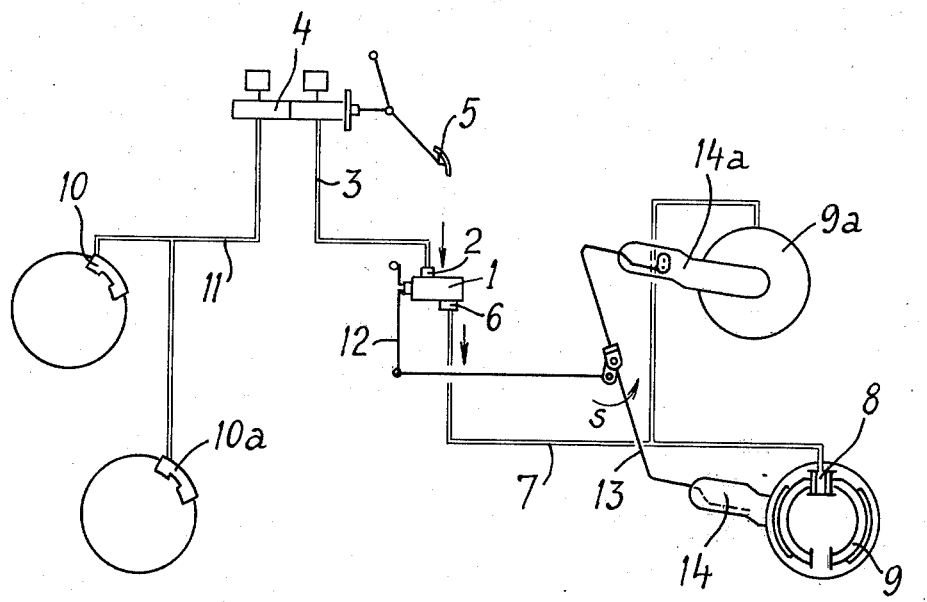
FIG. 1 is a schematic view of the braking circuit

In FIG. 1 there is shown a pressure limiting device according to the invention, having the inlet orifice 2 communicating via a conduit 3 with a master cylinder 4 the piston of which is operable with the aid of a brake pedal 5. The outlet orifice 6 of the limiting device is connected via a conduit 7 to slave cylinders 8 of the brakes 9, 9a of the rear wheels.

The master cylinder 4 is directly connected to the brakes 10, 10a of the front wheels, via a conduit 11.

The pressure limiting device 1 is controlled by a linkage 12 connected to means responsive to the load of the vehicle. To this end the linkage 12 is connected to an anti-roll bar 13 which is in turn connected to trailing arms 14, 14a supporting the rear wheels. The arrow S indicates the sense of rotation of the anti-roll bar 13 as the vehicle is loaded, while the arrow D indicates the forward direction of movement of the vehicle.

Figure 2:
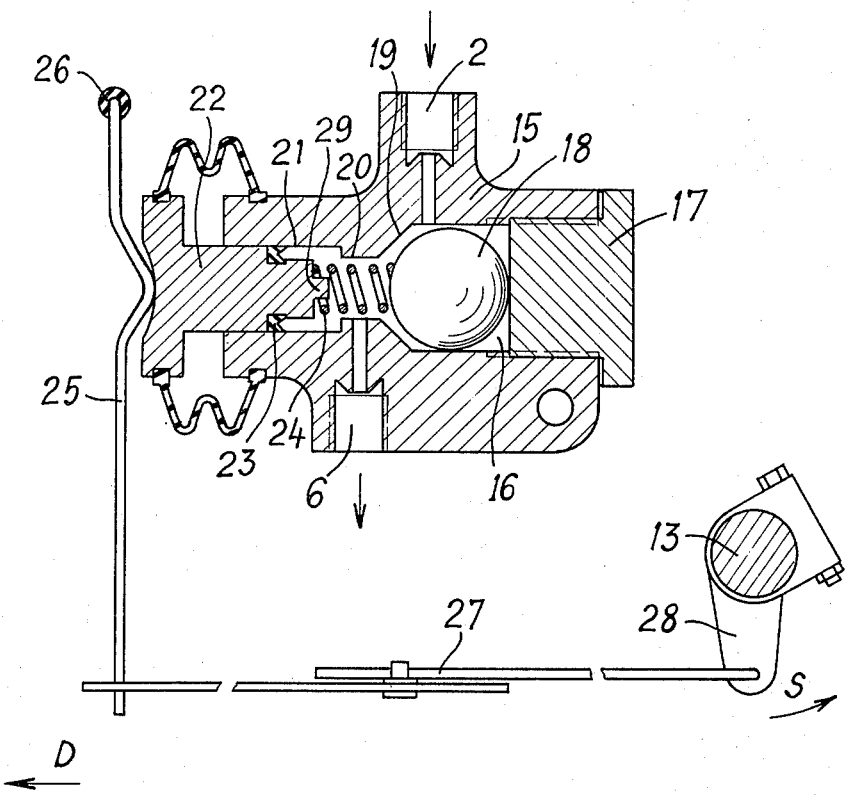
FIG. 2 is a view in longitudinal section of one embodiment of the pressure limiting device according to the invention.

FIG. 2 shows in greater detail one embodiment of the pressure limiting device 1 which comprises a body 15 having a chamber 16 closed by a threaded plug 17 and into which chamber the inlet orifice 2 opens. Within the chamber 16 is a ball 18 which simultaneously forms an inertia mass and a valve cooperating with a frusto-conical seat 19 provided at one of the ends of the chamber 16. To the side of the seat 19 away from the ball 18 is a passage 20 into which the outlet orifice 6 opens downstream of the seat 19.

The passage 20 is extended by a bore 21 in which is slidably mounted a piston 22 equipped with a sealing ring 23. A centering stud 29 at one end of the piston 22 supports a helical compression spring 24 mounted in compression between the said piston and the ball 18.

The linkage illustrated schematically at 12 in FIG. 1 comprises a first arm 25 anchored at a pivot support means 26 in a support member, not shown, and bearing with its median portion against the outwardly facing end of the piston 22. The arm 25 is connected by a second arm 27 of adjustable length to a lever 28 integral with the anti-roll bar 13.

The stress of the spring 24 is responsive to the load and ensures the kinematic connection between the means responsive to the load (anti-roll bar) and the mass formed by the ball 18.

The device operates in the following manner:-

The static loading of the vehicle is indicated by the position of the piston 22 in its bore 21. For this purpose the arm 25 of the rigid linkage 12 bears directly on the piston 22 in such manner that the force of the hydraulic pressure on the piston 22 is too weak to displace the piston outwardly along the bore 21.

Thus the state of load of the vehicle is reflected in the compression stress of the spring 24 which urges the ball 18 against the plug 17.

The inertia force exerted on the ball 18 towards the seat 19 during a deceleration of magintude γ is thus approximately proportional to the compression force of the spring 24. When the inertia force M γ is greater than the compression force of the spring 24, the deceleration γ is sufficient to enable the valve formed by the ball 18 to close off the orifice 6 from the inlet orifice 2. However as the loading on the rear axle increases, giving rise to an ability to withstand a greater braking effort without the incidence of wheel lock, the linkage 12 will displace the piston 22 rightwardly as viewed in FIG. 2, with the result that the spring 24 undergoes compressive strain and is preloaded to a greater compressive stress which must be overcome by M γ before the valve closes. This retards valve closing until a greater limiting value of γ is attained.

In FIGS. 3 and 4 there is shown a first alternative embodiment in which the body 30 of the limiter has interiorly a chamber 31 into which open the inlet orifice 2 and the outlet orifice 6. The chamber 31 is closed by a plug 32 forming the abutment member for a ball 33 constituting valve and inertia mass.

The ball 33 rests on an adjustable ramp 34 integral with a shaft 35 pivotally mounted in the body 30, the said shaft 35 being integral in rotation with an arm 36 connected by a connecting rod 37 to a lever 28 integral with the anti-roll bar 13.

The adjustable ramp 34 forms with the horizontal axis XX' an angle which varies directly as the loading on the rear axle. Note that in FIG. 3 the arrow S shows a clockwise movement of the anti-roll bar 13 rather than the anti-clockwise direction of arrow S in FIG. 2. The body 30 contains a centering bearing 38 which ensures the connection between the ramp 34 and the seat 39 of the valve-forming ball 33.

The inertia force exerted on the ball 33 up the slope of the ramp 34 is here proportional to cos $â$ and when the value of the force M γ cos $â$ permits the ball 33 to climb the inclined ramp 34, then the deceleration γ is sufficient to enable the valve to close. Thus as $â$ increases, cos $â$ decreases and hence the limiting value of γ must be greater for the ball to climb the ramp.

FIGS. 5, 6 and 7 show a second alternative embodiment of the pressure limiting device which comprises a body 40 having interiorly a chamber 41 closed by a junction plug 42 having the inlet orifice 2 formed therein, and a plug 43 having the outlet orifice 6 formed therein. On the plug 43 there is provided an annular seat 44 against which can come to bear a valve 45 integral with a shaft 46 sealingly pivotally supported in the body 40, the said shaft 46 carrying an arm 47 to the end of which is secured an inertia mass 48. The arm 47 is connected by a helical tension spring 51 to an arm 49 articulated at one of its ends in the body 40, about a shaft 50. To the other end of the arm 49 there is articulated a connection rod 52 linked to a lever 28 integral with the anti-roll bar 13. In this manner increasing load schematically shown by the arrow s results in the valve 45 being moved away from its seat 44 by virture of rightward movement of the tension spring 51 and its anchorage in the arm 49.

On the body 40 there is adjustably mounted a stop screw 53 (FIG. 7) against which the arm 49 is able to abut. Likewise, the arm 47 abuts a boss 54 (FIG. 7) provided on the body 40. The abutment members 53 and 54 make it possible to obtain an initial tensile pre-stressing of the spring 51.

In operation the static loading of the vehicle is determined by the tension of the spring 51 which is exerted on the mass 48 and consequently on the valve 45.

It is thus apparent that the valve 45 will close once the inertia force M γ exerted on the mass 48 is greater than the tension force of the spring 51. Consequently the minimum deceleration value corresponding to closing of the valve depends solely on the initial calibration of the limiting device, independently of the pressure of hydraulic fluid in the inlet orifice of the limiting device.

We claim:

1. In a braking pressure limiting device having a limiter body with a fluid inlet orifice, a fluid outlet orifice, means responsive to the load of the vehicle and an arm connected to the said load-responsive means, a valve comprising a piston slidably mounted in the body of the limiter, one end of the piston engaging an arm connected to the load responsive means, the other end of the piston being operatively connected to a spring mounted in compression between the piston and an inertia mass, said mass being a ball, said spring exerting the controlling force opposing the movement of the ball as long as the inertia force exerted by ball does not exceed the controlling force exerted by the spring.

2. In a braking pressure limiting device having a limiter body with a fluid inlet orifice, a fluid outlet orifice and a valve to isolate the inlet orifice from the outlet orifice, and means responsive to the load of the vehicle to exert a controlling force on an inertia mass, the improvement wherein the valve is integral with a shaft pivotally mounted in the limiter body, said shaft being rigidly secured with an arm carrying the inertia mass, a spring connecting said arm to a connection rod which is in turn connected to a means responsive to the loading of the vehicle, positioned to oppose the closing of the valve and provide means to adjust the initial stress of the spring.

3. A braking pressure limiting device for a braking system of a vehicle comprising a limiter body, a fluid inlet orifice, a fluid outlet orifice, a chamber in said body between the two orifices having a valve seat, a ball disposed in the chamber adapted to seat in the valve seat to separate the orifices, a shaft pivotally disposed in the chamber, a ramp supporting said ball in the chamber fixed to the shaft, means responsive to the load of the vehicle, and means connecting the said shaft to said load responsive means whereby the angle at which said ramp is disposed with respect to the longitudinal axis of the chamber is determined by the load on said load responsive means and the ball is disposed from the valve seat until the inertia force exerted on the ball during deceleration of the vehicle causes the ball to climb the ramp.

* * * * *